(12) United States Patent
Kitada et al.

(10) Patent No.: US 10,495,015 B2
(45) Date of Patent: Dec. 3, 2019

(54) DIAGNOSTIC DEVICE

(71) Applicant: MITSUBISHI JIDOSHA KOGYO KABUSHIKI KAISHA, Tokyo (JP)

(72) Inventors: Junya Kitada, Tokyo (JP); Hideo Matsunaga, Tokyo (JP); Satoshi Maeda, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 224 days.

(21) Appl. No.: 15/461,776

(22) Filed: Mar. 17, 2017

(65) Prior Publication Data
US 2017/0342930 A1 Nov. 30, 2017

(30) Foreign Application Priority Data

May 27, 2016 (JP) .................. 2016-106344

(51) Int. Cl.
*F02D 41/22* (2006.01)
*F02D 41/40* (2006.01)
*F02D 41/24* (2006.01)
*F02D 41/30* (2006.01)
*F02D 41/14* (2006.01)

(52) U.S. Cl.
CPC ....... *F02D 41/221* (2013.01); *F02D 41/1482* (2013.01); *F02D 41/2454* (2013.01); *F02D 41/3094* (2013.01); *F02D 41/402* (2013.01); *F02D 41/3064* (2013.01); *F02D 2041/224* (2013.01); *F02D 2200/101* (2013.01)

(58) Field of Classification Search
CPC ............ F02D 41/221; F02D 41/1482; F02D 41/2454; F02D 41/3094; F02D 41/402; F02D 41/3064; F02D 2041/224; F02D 2200/101; Y02T 10/44
USPC ........................................... 701/103
See application file for complete search history.

(56) References Cited

U.S. PATENT DOCUMENTS

| | | | | |
|---|---|---|---|---|
| 4,348,727 A | * | 9/1982 | Kobayashi | F02D 41/2422 123/480 |
| 4,365,299 A | * | 12/1982 | Kondo | F02D 41/263 123/480 |
| 4,881,505 A | * | 11/1989 | Tomisawa | F02D 41/14 123/480 |

(Continued)

FOREIGN PATENT DOCUMENTS

JP          4640012 B2      3/2011

*Primary Examiner* — Hung Q Nguyen
*Assistant Examiner* — Susan E Scharpf
(74) *Attorney, Agent, or Firm* — Birch, Stewart, Kolasch & Birch, LLP

(57) ABSTRACT

A diagnostic device incorporates a processor and a memory and diagnoses a failure related to a fuel injection system for an engine whose air-fuel ratio of is feedback-controlled. The diagnostic device includes a calculation unit which calculates a corrected value of a fuel injection amount according to a difference between a target value and a measured value of the air-fuel ratio. The diagnostic device includes a setting unit which sets a mask period in which a failure diagnosis is suspended, according to the corrected value upon switchover of a fuel injection mode. The diagnostic device includes a diagnostic unit which does not carry out the diagnosis in the mask period and carries out the diagnosis outside the mask period.

16 Claims, 4 Drawing Sheets

(56) References Cited

U.S. PATENT DOCUMENTS

| | | | | |
|---|---|---|---|---|
| 4,915,081 A * | 4/1990 | Fujimoto | F02D 41/1475 | 123/682 |
| 4,958,611 A * | 9/1990 | Uchinami | F02D 41/1494 | 123/690 |
| 4,991,102 A * | 2/1991 | Sakamoto | F02D 41/2454 | 123/480 |
| 5,197,450 A * | 3/1993 | Kitajima | F02D 41/0025 | 123/1 A |
| 5,487,270 A * | 1/1996 | Yamashita | F01N 11/007 | 60/276 |
| 6,981,487 B2 * | 1/2006 | Ohtani | F02D 41/3094 | 123/299 |
| 7,247,190 B2 * | 7/2007 | Miura | F02D 41/0275 | 55/282.2 |
| 9,739,225 B2 * | 8/2017 | Nakagawa | F02D 41/0235 | |
| 2002/0100272 A1 * | 8/2002 | Nishimura | F02D 41/3064 | 60/285 |
| 2003/0070423 A1 * | 4/2003 | Morinaga | F01N 3/2006 | 60/284 |
| 2003/0159432 A1 * | 8/2003 | Kobayashi | F01N 3/101 | 60/274 |
| 2004/0216450 A1 * | 11/2004 | Okazaki | F01N 3/101 | 60/285 |
| 2007/0023021 A1 * | 2/2007 | Shouda | F02D 41/062 | 123/685 |
| 2009/0138172 A1 * | 5/2009 | Okazaki | F01N 3/101 | 701/103 |
| 2010/0049422 A1 * | 2/2010 | Moriya | F02D 35/023 | 701/103 |
| 2010/0050602 A1 * | 3/2010 | Fujimoto | F01N 11/007 | 60/277 |
| 2012/0047992 A1 * | 3/2012 | Sasai | F02D 19/084 | 73/23.32 |
| 2013/0041571 A1 * | 2/2013 | Nogi | F02D 41/025 | 701/103 |
| 2013/0073181 A1 * | 3/2013 | Mamada | F02D 28/00 | 701/103 |
| 2013/0080033 A1 * | 3/2013 | Fujiwara | F02D 41/126 | 701/104 |
| 2013/0144510 A1 * | 6/2013 | Iwazaki | F02D 41/0085 | 701/104 |
| 2013/0158841 A1 * | 6/2013 | Ito | F02D 41/0085 | 701/104 |
| 2014/0294678 A1 * | 10/2014 | Takano | F02D 41/0295 | 422/111 |
| 2016/0017827 A1 * | 1/2016 | Jammoussi | F02D 41/1454 | 701/105 |
| 2016/0076474 A1 * | 3/2016 | Yoshikawa | F02D 41/1441 | 123/703 |
| 2016/0312731 A1 * | 10/2016 | Tsuchiya | F02D 41/2461 | |

* cited by examiner

DIAGNOSTIC DEVICE

CROSS-REFERENCE TO THE RELATED APPLICATION

This application incorporates by references the subject matter of Application No. 2016-106344 filed in Japan on May 27, 2016 on which a priority claim is based under 35 U.S.C.§ 119(a).

FIELD

The present invention relates to a diagnostic device which diagnoses a failure related to a fuel injection system for an engine.

BACKGROUND

Conventionally, a technique is known where an actual air-fuel ratio is detected by an air-fuel ratio sensor or an oxygen concentration sensor mounted on an exhaust system and a failure determination based on the actual air-fuel ratio is carried out in a fuel injection system which feedback-controls the air-fuel ratio of an engine. That is, in the above technique, it is determined that any kind of failure occurs in the fuel injection system in a case where the actual air-fuel ratio greatly deviates from a target air-fuel ratio even when feedback control is performed with an aim to adjust the actual air-fuel ratio such that the ratio becomes close to the target air-fuel ratio.

Meanwhile, in the above technique, a sudden change in the fuel injection amount, the actual air-fuel ratio, the target air-fuel ratio, or the like due to a change in a fuel infection mode causes the actual air-fuel ratio to temporarily fluctuate greatly, which may lead to an erroneous determination. Therefore, it is proposed that a failure determination based on the actual air-fuel ratio is prohibited during a period from when the fuel injection mode is changed until a fixed time passes in order to prevent an erroneous failure determination (For example, see JP 4640012 B1).

However, if a failure determination is prohibited without exception when the fuel injection mode is changed, discovery of a failure which occurs in the fixed time period will be naturally delayed. Therefore, failure diagnosis accuracy lowers. In addition, delay in discovery of the failure causes the air-fuel ratio to be kept inappropriately controlled in an unstable engine combustion state, which may lower stability and reliability of engine control. Such a problem becomes more evident especially as engine rotation speed is higher.

SUMMARY

Technical Problems

In view of the above-described problem, an object of the present invention is to provide a diagnostic device which efficiently prevents an erroneous failure determination and enables improvement in diagnosis accuracy. Note that another object of the present invention may be to provide an operation and effect derived from each configuration described in description of embodiments to be described later, the operation and effect being unable to be obtained in a conventional technique.

Solution to Problems (1) A disclosed diagnostic device is a diagnostic device which diagnoses a failure related to a fuel injection system for an engine whose air-fuel ratio of is feedback-controlled. The diagnostic device includes a processor and a memory storing a program executed by the processor. The diagnostic device includes a calculation unit which calculates a corrected value of a fuel injection amount according to a difference between a target value and a measured value of the air-fuel ratio. In addition, the diagnostic device includes a setting unit which sets a mask period in which a diagnosis of the failure is suspended, according to the corrected value upon switchover of a fuel injection mode performed by the fuel injection system. Furthermore, the diagnostic device includes a diagnostic unit which does not carry out the diagnosis in the mask period and carries out the diagnosis outside the mask period. The calculation unit, the setting unit, and the diagnostic unit are realized by the processor and the memory.

Advantageous Effects

By making the mask period variable, it is possible to set a diagnosis suspension period which is appropriate for an engine operation state and to improve diagnosis accuracy by effectively preventing a misdiagnosis.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

A diagnostic device as an embodiment will be described with reference to the drawings. Note that the following embodiment is illustrated by way of example only, and is not intended to exclude application of various modifications and techniques not illustrated in the following embodiment. Each configuration of the present embodiment may be modified in various forms within a scope not deviating from the spirit of each configuration. In addition, configurations of the present embodiment may be selectively employed as appropriate or appropriately combined with one another.

[1. Engine]

Figure 1:
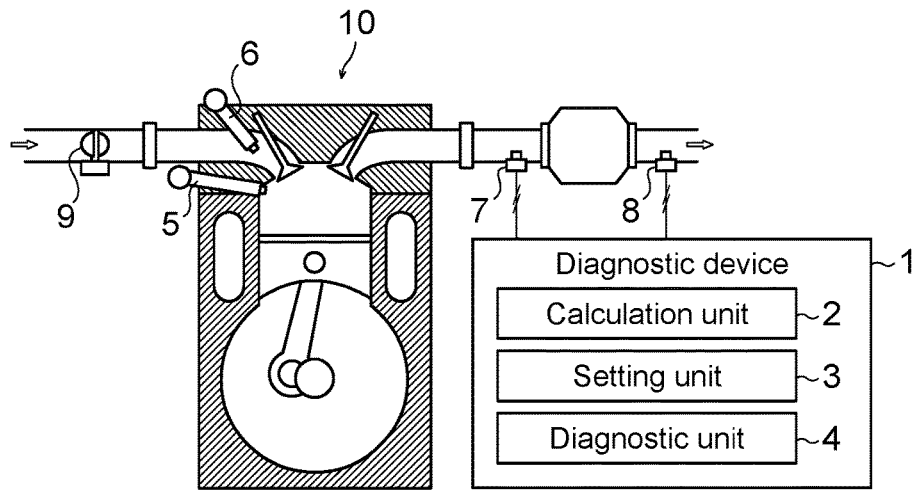
FIG. 1 is a schematic view depicting a fuel injection system for an engine and a diagnostic device.

FIG. 1 is a schematic view depicting a fuel injection system for an engine 10 mounted on a vehicle, and a diagnostic device 1 which diagnoses a failure related to the fuel infection system. Here, one of a plurality of cylinders is depicted. As the fuel injection system, a system which performs fuel injection using in-cylinder injection (direct injection, DI) and port injection (multipoint injection, MPI) will be illustrated. Each cylinder includes an in-cylinder injection valve 5 which injects fuel inside the cylinder, and a port injection valve 6 which injects fuel inside an intake port. In addition, a throttle valve 9 is arranged in an intake system of the engine 10. The air-fuel ratio (A/F) of air-fuel mixture introduced into the cylinder may fluctuate depending on the amount of fuel injected from the in-cylinder injection valve 5 and the port injection valve 6 and an intake amount controlled by the opening degree of the throttle valve 9.

A sensor for measuring an air-fuel ratio (alternatively, excess air ratio or equivalent ratio) is attached to an exhaust system. In the example illustrated in FIG. 1, a first air-fuel ratio sensor 7 is provided on an upstream side of an exhaust gas purification catalyst, and a second air-fuel ratio sensor 8 is provided on a downstream side of the exhaust gas purification catalyst. The air-fuel ratio sensors 7 and 8 are sensors which may output signals corresponding to oxygen concentration or hydrocarbon concentration in an exhaust gas. Examples of the air-fuel ratio sensors 7 and 8 include a linear air-fuel ratio sensor (LAFS) and a zirconia type oxygen concentration sensor. A signal output from each of the air-fuel ratio sensors 7 and 8 corresponds to an actual air-fuel ratio (that is, a measured value of the air-fuel ratio) estimated from the oxygen concentration or hydrocarbon concentration in an exhaust gas.

The air-fuel ratio of air-fuel mixture burned inside the cylinder of the engine 10 is feedback-controlled (F/B controlled) by an engine control device, not illustrated, according to the difference between a target value and a measured value of the air-fuel ratio. In feedback control, the fuel amount and the intake amount are corrected for each stroke such that the difference between the target value and the measured value of the air-fuel ratio becomes small. In general, examples of a corrected value in feedback control include a proportional corrected value set according to a difference between the target value and the measured value of the air-fuel ratio, a differential corrected value set according to a differential value of the difference, an integrated corrected value set according to the integrated value of the difference. In feedback control according to the present embodiment, at least a F/B integrated value, which is an integrated corrected value (integrated value of the difference), and an A/F learned value, which corresponds to a steady component of the F/B integrated value are included. Calculation methods for the above values will be described later.

Figure 2A:
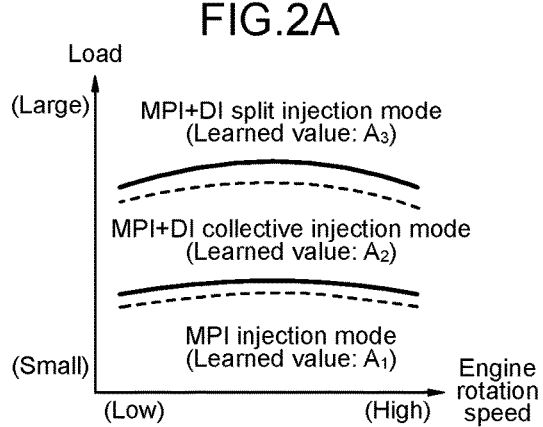
FIGS. 2A to 2C are examples of maps for selecting a fuel injection mode.
Figure 2B:
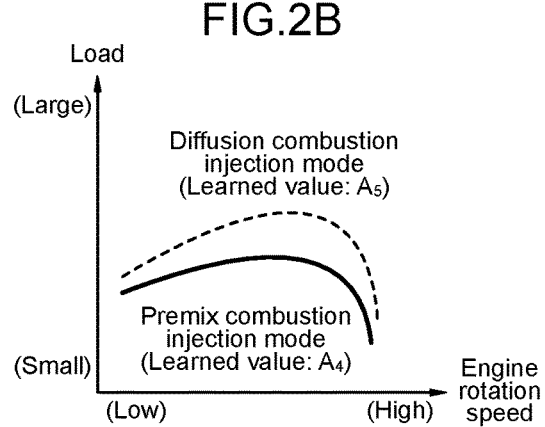
Figure 2C:
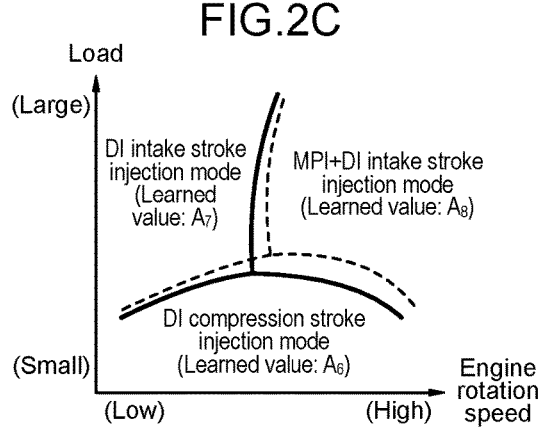

A plurality of kinds of injection modes (fuel infection modes) are set in advance for the engine 10, and the fuel injection mode is switched over by the fuel injection system according to the magnitude of the output demanded for the engine 10 or the operation state (engine rotation speed, load, and the like) of the engine. Maps for setting the fuel injection mode are illustrated in FIGS. 2A to 2C. FIG. 2A is a map for the fuel injection system for which three types of injection modes, that is, a MPI injection mode, a MPI+DI collective injection mode, and a MPI+DI split injection mode, are set. FIG. 2B is a map for the fuel injection system for which two types of injection modes, that is, a diffusion combustion injection mode and a premix combustion injection mode, are set. FIG. 2C is a map for the fuel injection system for which three types of injection modes, that is, a DI compression stroke injection mode, a DI intake stroke injection mode, and a MPI+DI intake stroke injection mode, are set. A solid line and a broken line on each map represent hysteresis characteristics (history characteristics) imparted to a boundary between the injection modes.

The MPI injection mode is an injection mode for injecting fuel from the port injection valve 6. In contrast, the MPI+DI collective injection mode and the MPI+DI split injection mode are injection modes for injecting fuel mainly from the in-cylinder injection valve 5. In some cases, fuel is injected also from the port injection valve 6. In the MPI+DI collective injection mode, injection from the in-cylinder injection valve 5 is single injection (fuel is injected a single time), and in the MPI+DI split injection mode, injection from the in-cylinder injection valve 5 is split injection (fuel is injected a plurality of times).

The diffusion combustion injection mode is an injection mode for performing multistage injection from a compression stroke to a combustion stroke in order to realize diffusion combustion in the cylinder of the engine 10. In contrast, the premix combustion injection mode is an injection mode for injecting fuel only in the compression stroke in order to realize premix combustion.

The DI compression stroke injection mode is an injection mode for performing in-cylinder injection in the compression stroke. The DI intake stroke injection mode is an injection mode for performing in-cylinder injection in the intake stroke. The MPI+DI intake stroke injection mode is an injection mode for performing in-cylinder injection and port injection in combination.

The diagnostic device 1 is an electronic control device (computer, ECU) which has a function of diagnosing a failure related to the fuel injection system for the engine 10, and is connected to an on-vehicle network of the vehicle on which the engine 10 is mounted. In addition to the above air-fuel ratio sensors 7 and 8, the engine 10, accessories, various sensors, and the like are connected to the on-vehicle network. A processor, a memory, an interface device and the like, which are interconnected via a bus, are incorporated in the diagnostic device 1. Note that the function of the diagnostic device 1 may be incorporated in the above-described engine control device.

The processor is a processing device which incorporates, for example, a control unit (control circuit), an arithmetic unit (arithmetic circuit), and a cache memory (register). The memory is a storage device which stores a program and currently working data, and includes a ROM, a RAM, a non-volatile memory, and the like. Content of control performed by the diagnostic device 1 is recorded and stored in the memory as firmware or an application program. Upon execution of a program, the content of the program is developed in a memory space and is executed by the processor.

[2. Control Configuration]

The diagnostic device 1 in FIG. 1 schematically illustrates the function of the device with a block diagram. The diagnostic device 1 includes a calculation unit 2, a setting unit 3, and a diagnostic unit 4. In the present embodiment, it is assumed that the function of each unit is realized by software. However, part of or entirety of each function may be realized by hardware (electronic control circuit) or may be realized by software and hardware in combination.

The calculation unit 2 calculates a corrected amount of a fuel injection amount according to a difference between a target value and a measured value of an air-fuel ratio. Here, as the corrected amount, the above F/B integrated value, which is an integrated corrected value, and the above A/F learned value, which is a learned value, are calculated. The F/B integrated value is always calculated in operation of the engine 10. The A/F learned value is calculated under a situation where predetermined learning conditions are satisfied. The learning conditions include passage of a predetermined number of strokes (or a predetermined time period) from previous calculation of the A/F learned value, a stable actuation state of the engine 10, and the like. In the present embodiment, it is assumed that a unique A/F learned value is set for each injection mode. However, there may be injection modes which have an identical A/F learned value.

It is assumed that the F/B integrated value is calculated according to the integrated value of values each obtained by subtracting the measured value of the air-fuel ratio from the target value of the air fuel ratio. For example, it is assumed that the F/B integrated value is the value obtained by multiplying the integrated value by a predetermine gain. In this case, when the measured value of the air-fuel ratio is leaner than the target value of the air-fuel ratio (the measured value is greater than the target value), the F/B integrated value becomes negative, and the absolute value of the F/B integrated value becomes greater as the measured value becomes leaner. In contrast, when the measured value is richer than the target value, the F/B integrated value becomes positive, and the absolute value of the F/B integrated value becomes greater as the measured value becomes richer. However, in a case where the A/F learned value to be described below is set to a value other than zero, the value obtained by subtracting the A/F learned value from the F/B integrated value at that time is calculated as the final F/B integrated value.

It is assumed that the A/F learned value is a value obtained by performing delay processing (for example, averaging processing such as primary low-pass filter processing or moving average processing) on the F/B integrated value. When the measured value of the air-fuel ratio is leaner than the target value of the air-fuel ratio, the A/F learned value becomes negative, and the absolute value of the A/F learned value becomes greater as the measured value is leaner. In contrast, when the measured value is richer than the target value, the A/F learned value becomes positive, and the absolute value of the A/F learned value becomes greater as the measured value is richer. By performing delay processing on the F/B integrated value, noise and a high-frequency vibration component included in the F/B integrated value are removed, and a value corresponding to the steady component of the F/B integrated value is extracted. Note that specific calculation methods for the F/B integrated value and the A/F learned value are not limited to the above calculation methods, and a known feedback control method may be adopted.

The setting unit 3 sets a mask period according to the corrected amount of the fuel injection amount (for example, the above F/B integrated value, the above A/F learned value, and the like) upon switchover of the injection mode (fuel injection mode) performed by the fuel injection system. The mask period refers to a period in which a failure diagnosis is suspended. The conditions for setting the mask period are illustrated below. The mask period is set in a case where at least one of conditions 1 to 4 is satisfied, and is preferably set in a case where all the conditions 1 to 4 are satisfied.

Condition 1. The mode has been switched to an injection mode which has a different A/F learned value.
Condition 2. The A/F learned value reaches the upper limit or the lower limit of a normal range.
Condition 3. The sign of the F/B integrated value and the sign of the A/F learned value coincide with each other.
Condition 4. The F/B integrated value is outside the normal range.

The F/B integrated value included in the above conditions 1 to 4 is preferably the F/B integrated value immediately before the injection mode is switched over. In contrast, the A/F learned value is preferably the A/F learned value immediately after the injection mode has been switched over.

The mask period is set so as to correspond to the deviation amount of the F/B integrated value from the normal range. For example, in a case where the F/B integrated value is positive, the mask period is set according to the value obtained by subtracting the upper limit value of the normal range from the F/B integrated value. In addition, in a case where the F/B integrated value is negative, the mask period is set according to the value obtained by subtracting the F/B integrated value from the lower limit of the normal range. That is, since the mask period is extended longer as the deviation amount from the normal range is greater, an erroneous failure determination which may be caused by switchover of the injection mode is efficiently prevented.

Figure 3:
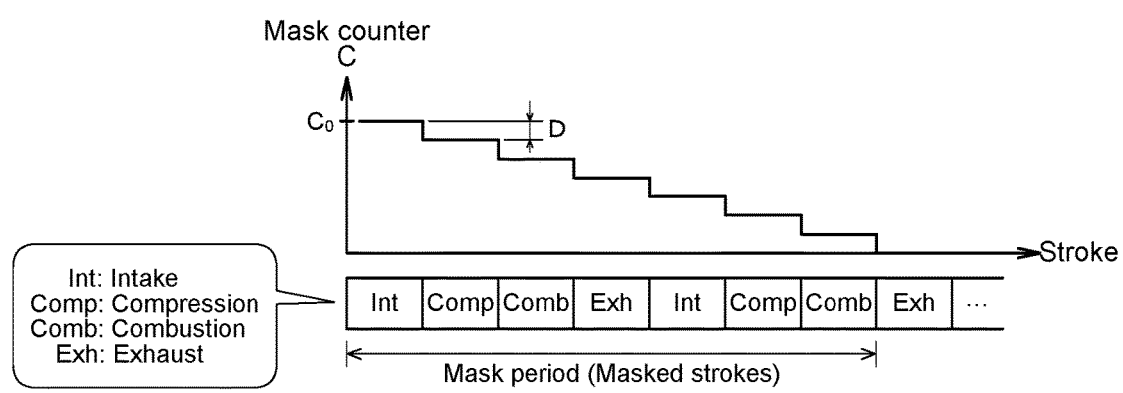
FIG. 3 is a graph for explaining a mask period in which a failure diagnosis is suspended.

The setting unit 3 according to the present embodiment sets the mask period in units of strokes of the engine 10. That is, the mask period is given by the number of strokes (so-called ignition number). For example, as illustrated in FIG. 3, when the mask period is set to $C_0$, the value is input to a mask counter C, and the value is reduced by a predetermined value D (for example, D=1) each time the stroke advances. Then, the time period until when the value of the mask counter C becomes less than or equal to 0 is set as a failure diagnosis suspension time period. The suspension time period becomes shorter as the engine rotation speed is higher even if the mask period is constant. That is, by setting the mask period in units of strokes of the engine 10, it is possible to provide the failure diagnosis suspension time period which is appropriate for the engine rotation speed, and failure diagnosis accuracy improves.

The diagnostic unit 4 always performs a failure diagnosis of the fuel injection system except in the mask period set by the setting unit 3. Here, in a case where a state in which the A/F learned value reaches the upper limit value or the lower limit value of the normal range and the F/B integrated value is outside the normal range continues for a predetermined time period, it is diagnosed as a failure of the fuel injection system. The diagnosis is recorded and stored in the memory as a failure code (diagnosis code), and is displayed on a meter panel provided in a cabin.

[3. Flowchart]

Figure 4:
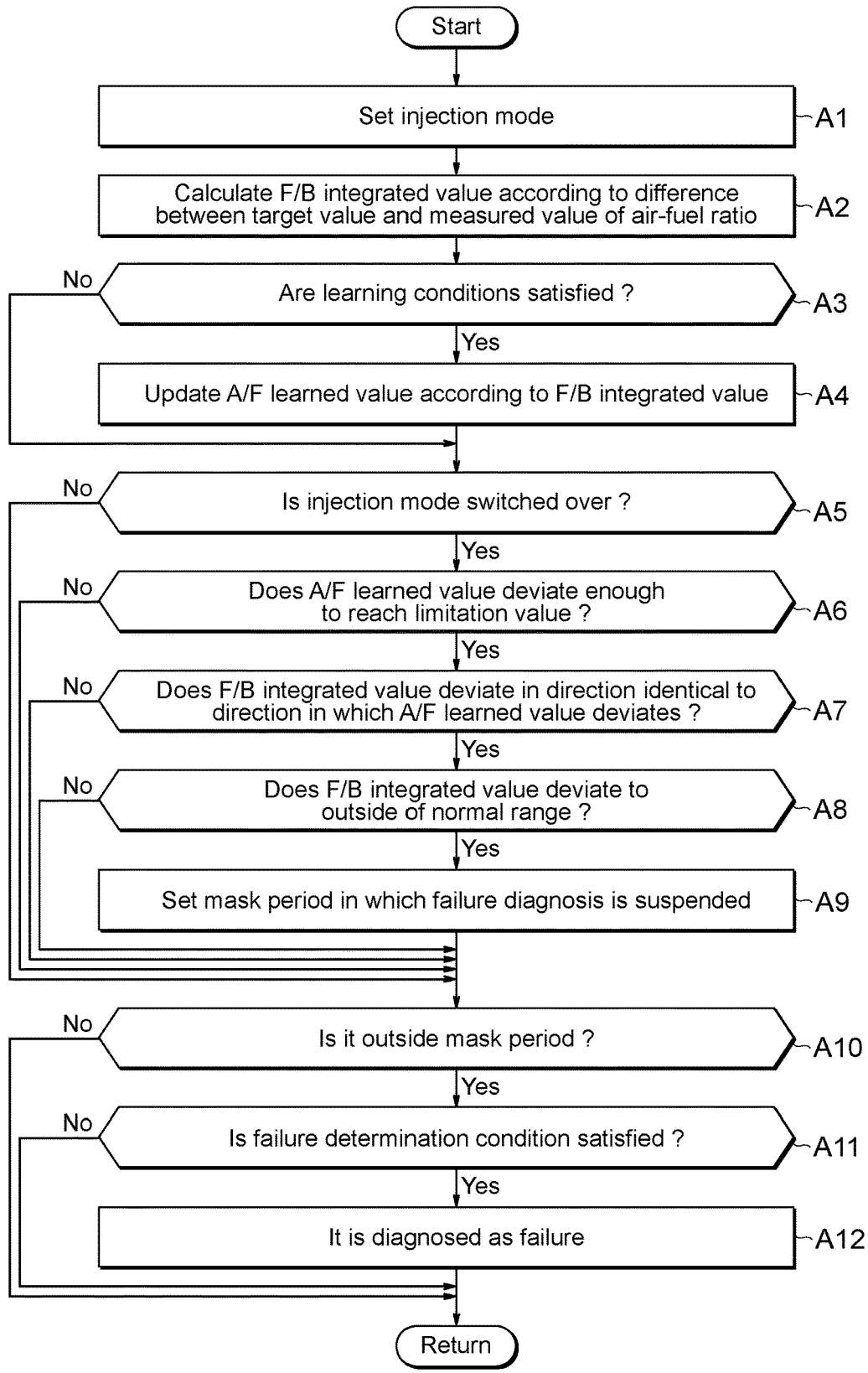
FIG. 4 is a flowchart illustrating control procedures in the diagnostic device.

FIG. 4 is a flowchart illustrating failure diagnosis procedures for the fuel injection system. According to the actuation state of the engine 10, the injection mode is selected and set (A1), and the F/B integrated value is calculated according to the difference between the target value and the measured value of the air-fuel ratio (A2). If the predetermined learning conditions are satisfied (A3), the A/F learned value is updated and learned for each injection mode according to the F/B integrated value (A4). Note that if the leaning conditions are not satisfied, the existing A/F learned value is not changed and is maintained.

In addition, in a case where the injection mode is switched over in step A1 (A5, corresponding to condition 1), it is determined whether or not the setting conditions for the mask period are satisfied. First, it is determined whether or not the A/F learned value deviates enough to reach a limitation value (for example, the upper value or the lower value of the normal range) (A6, corresponding to condition 2). Next, it is determined whether or not the F/B integrated value deviates in the direction identical to the direction in which the A/F learned value deviates (A7, corresponding to condition 3). In addition, it is determined whether or not the F/B integrated value deviates to the outside of the normal range (A8, corresponding to condition 4). In the above condition determination, the F/B integrated value immediately before the injection mode is switched over and the A/F learned value immediately after the injection mode has been switched over are referred to. When these conditions are satisfied, the mask period is set in units of strokes of the engine 10 according to the corrected amount of the fuel injection amount (A9).

Then, it is determined whether or not the mask period has passed (A10), and if this condition is not satisfied, control in this arithmetic operation period is terminated. In the subsequent arithmetic operation periods, a failure diagnosis is suspended until the mask period has passed. Thus, an erroneous failure determination immediately after switchover of the injection mode is prevented. After the mask period has passed, it is determined whether or not a failure determination condition for the fuel injection system is satisfied (A11). For example, it is determined whether or not the state where the A/F learned value reaches the limited value and the F/B integrated value is outside the normal range continues for a predetermined time period. If this failure determination condition is satisfied, it is diagnosed by the diagnostic unit 4 as a failure of the fuel injection system (A12), and the diagnosis is recorded and stored in the memory and is displayed on the meter panel.

[4. Operation and Effect]

Figure 5A:
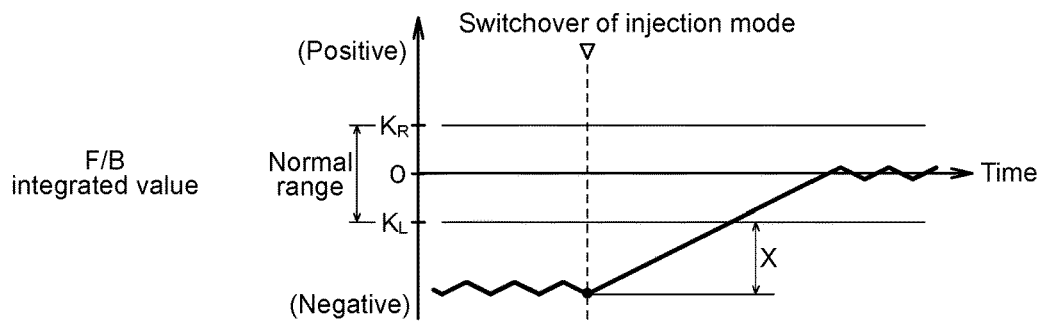
FIG. 5A is a graph illustrating a change in a F/B integrated value upon switchover of the injection mode.
Figure 5B:
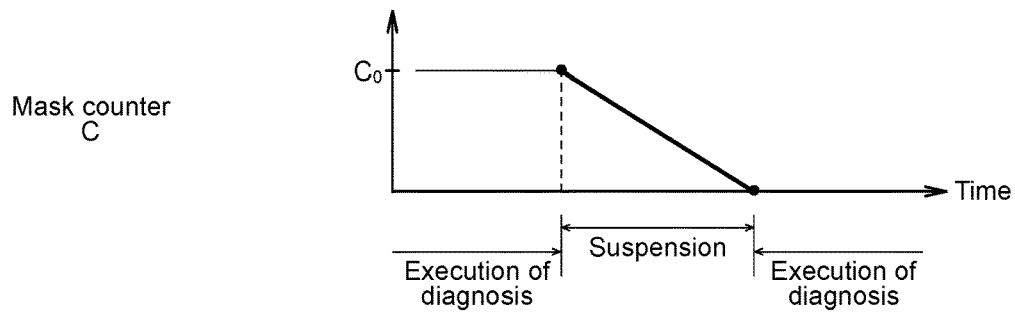
FIG. 5B is a graph illustrating a change in a value of a mask counter.

(1) FIG. 5A illustrates a change in the F/B integrated value before and after switchover of the injection mode, and FIG. 5B illustrates a change in the value of the mask counter C. In FIG. 5A, $K_L$ denotes the lower limit value of the normal range of the F/B integrated value and the A/F learned value, and $K_R$ denotes the upper limit value of the normal range. Before switchover of the injection mode, even if the F/B integrated value is a negative value smaller than $K_L$, it is not diagnosed as a failure as long as the A/F learned value is within the normal range. However, in a case where the A/F learned value is changed due to switchover of the injection mode and the value reaches $K_L$, it may be diagnosed as a failure if the F/B integrated value is kept to be smaller than $K_L$ for a long time.

In contrast, in the diagnostic device 1, the mask period is set according the corrected value of the fuel injection amount upon switchover of the injection mode. The mask period is set as a variable period corresponding to the F/B integrated value and the A/F learned value. Thus, it is possible to set the diagnosis suspension period which is appropriate for the operation state of the engine 10 and to improve diagnosis accuracy by effectively preventing a misdiagnosis. In addition, since reliability of the failure diagnosis improves, it is possible to enhance control stability of the engine 10.

(2) Upon setting of the mask period, by using the F/B integrated value and the A/F learned value in combination, it is possible to normalize the diagnosis suspension period and to prevent a misdiagnosis.

(3) By using the F/B integrated value immediately before switchover of the injection mode and the A/F learned value immediately after the switchover, it is possible to set the diagnosis suspension period taking into consideration only the influence of the switchover of the injection mode, to more reliably prevent a misdiagnosis of a failure, and to improve diagnosis accuracy.

(4) In the diagnostic device 1, one of the conditions for setting the mask period is switchover to the injection mode with a different A/F learned value. That is, even if the injection mode is switched over, the mask period is not set and a failure diagnosis is performed unless the A/F learned value is changed. Therefore, it is possible to avoid a situation in which a failure diagnosis is excessively suspended or prohibited, and to improve diagnosis accuracy.

(5) In the diagnostic device 1, the mask period is set in a case where the sign of the F/B integrated value matches the sign of the A/F learned value (that is, the deviation direction of the A/F learned value from the target value of the air-fuel ratio matches the deviation direction of the F/B integrated value from the target value). Thus, it is possible to perform a diagnosis immediately after switchover in a state where a misdiagnosis does not occur, and to improve diagnosis accuracy.

(6) In the diagnostic device 1, the mask period is set in a case where the F/B integrated value is outside the normal range. In other words, since the F/B integrated value is within the normal range, the mask period is not set. Therefore, it is possible to perform a diagnosis immediately after switchover while avoiding a misdiagnosis, and to improve diagnosis accuracy. In addition, it is possible to improve stability and reliability of engine control.

(7) As illustrated in FIG. 5A, the mask period is set so as to correspond to a deviation amount X of the F/B integrated value from the normal range. This is because it may take some time for the F/B integrated value to fall within the normal range even in a case where there is no failure in the fuel injection system. By setting the diagnosis suspension period according to the deviation amount X, it is possible to normalize the diagnosis suspension period and to effectively prevent a misdiagnosis.

Figure 6A:
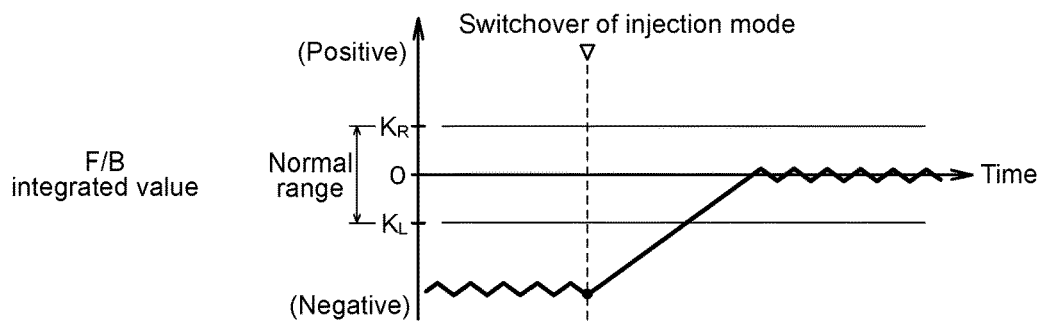
FIGS. 6A and 6B are graphs illustrating the F/B integrated value and the value of the mask counter, respectively, in a case where engine rotation speed is higher than the engine rotation speed in FIGS. 5A and 5B.
Figure 6B:
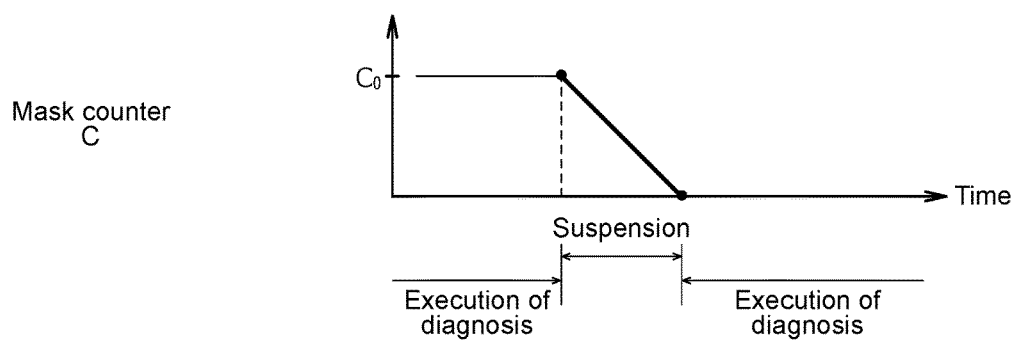

(8) Note that the time period until when the F/B integrated value falls within the normal range is shorter as the engine rotation speed is higher, as illustrated in FIG. 6A. Therefore, the mask period is preferably set shorter as the engine rotation speed is higher. In this respect, since the mask period is set in units of strokes in the diagnostic device 1, the mask period is normalized according to the engine rotation speed as illustrated in FIG. 6B. As described, it is possible to provide a failure diagnosis suspension time period which is appropriate for the engine rotation speed, and to improve failure diagnosis accuracy.

(9) Note that in the diagnostic device 1, the mask period is set in a case where the A/F learned value reaches the upper limit value or the lower limit value of the normal range. As described, by setting the mask period on the assumption that the A/F learned value is kept at the limit value, it is possible to set a limitation on setting of the mask period in a state where a misdiagnosis does not occur (state where a misdiagnosis is not likely to occur), and to improve diagnosis accuracy.

[5. Modifications]

It is possible to apply the above setting of the mask period to switchover among various injection modes as described in FIGS. 2A to 2C, and the kinds of specific fuel injection modes are not limited in any way. In addition, the kind of the engine 10 is arbitrary, and it is possible to apply the present invention to a gasoline engine, a lean burn engine, and a diesel engine. The same applies to the fuel injection method. A fuel injection system performing only in-cylinder injection may be assumed, or a fuel injection system performing only port injection may be assumed. Note that at least one sensor for detecting an actual air-fuel ratio is provided on the exhaust system.

The invention thus described, it will be obvious that the same may be varied in many ways. Such variations are not to be regarded as a departure from the scope of the invention, and all such modifications as would be obvious to one skilled in the art are intended to be included within the scope of the following claims.

REFERENCE SIGNS LIST 1 diagnostic device
2 calculation unit
3 setting unit
4 diagnostic unit
5 in-cylinder injection valve
6 port injection valve
7 first air-fuel ratio sensor
8 second air-fuel ratio sensor
9 throttle valve
10 engine

CITATION LIST

Patent Literature 1: JP 4640012 B2 (2011.03.02)

The invention claimed is:

1. A diagnostic device that diagnoses a failure related to a fuel injection system for an engine whose air-fuel ratio of is feedback-controlled, the diagnostic device comprising:
 a processor; and
 a memory storing a program that causes the processor to:
  calculate a corrected value of a fuel injection amount according to a difference between a target value and a measured value of the air-fuel ratio;
  set a mask period in which a diagnosis of the failure is suspended, according to the corrected value upon switchover of a fuel injection mode which is performed by the fuel injection system, the fuel injection system including a system that performs fuel injections by selectively using an in-cylinder injection and a port injection according to a selected fuel injection mode; and
  suspend carrying out the diagnosis in the mask period and carry out the diagnosis outside the mask period,
 wherein, the mask period is set based on the corrected value to a time period that is not a constant value.

2. The diagnostic device according to claim 1, wherein in the step of calculating the corrected value, the program further causes the processor to calculate an integrated value of the difference and a learned value which corresponds to a steady component of the integrated value, and
 in the step of setting the mask period, the program further causes the processor to set the mask period by using the integrated value and the learned value.

3. The diagnostic device according to claim 2, wherein in the step of setting the mask period, the program further causes the processor to set the mask period by using the integrated value immediately before the switchover and the learned value immediately after the switchover.

4. The diagnostic device according to claim 3, wherein the switchover is switchover to a fuel injection mode with a different learned value.

5. The diagnostic device according to claim 3, wherein in the step of setting the mask period, the program further causes the processor to set the mask period in a case where a deviation direction of the learned value from the target value matches a deviation direction of the integrated value from the target value.

6. The diagnostic device according to claim 4, wherein in the step of setting the mask period, the program further causes the processor to set the mask period in a case where a deviation direction of the learned value from the target value matches a deviation direction of the integrated value from the target value.

7. The diagnostic device according to claim 3, wherein in the step of setting the mask period, the program further causes the processor to set the mask period in a case where the integrated value is outside a normal range in which the target value is included.

8. The diagnostic device according to claim 4, wherein in the step of setting the mask period, the program further causes the processor to set the mask period in a case where the integrated value is outside a normal range in which the target value is included.

9. The diagnostic device according to claim 6, wherein in the step of setting the mask period, the program further causes the processor to set the mask period in a case where the integrated value is outside a normal range in which the target value is included.

10. The diagnostic device according to claim 9, wherein in the step of setting the mask period, the program further causes the processor to set the mask period which corresponds to a deviation amount of the integrated value from the normal range.

11. The diagnostic device according to claim 1, wherein in the step of setting the mask period, the program further causes the processor to set the mask period in units of strokes of the engine.

12. The diagnostic device according to claim 9, wherein in the step of setting the mask period, the program further causes the processor to correct the mask period according to engine rotation speed.

13. The diagnostic device according to claim 10, wherein in the step of setting the mask period, the program further causes the processor to correct the mask period according to engine rotation speed.

14. The diagnostic device according to claim 12, wherein in the step of setting the mask period, the program further causes the processor to make the mask period shorter as the engine rotation speed is higher.

15. The diagnostic device according to claim 13, wherein in the step of setting the mask period, the program further causes the processor to make the mask period shorter as the engine rotation speed is higher.

16. A diagnostic device that diagnoses a failure related to a fuel injection system for an engine whose air-fuel ratio of is feedback-controlled, the diagnostic device comprising:
 a processor; and
 a memory storing a program that causes the processor to:
  calculate a corrected value of a fuel injection amount according to a difference between a target value and a measured value of the air-fuel ratio;
  set a mask period in which a diagnosis of the failure is suspended, according to the corrected value upon switchover of a fuel injection mode which is performed by the fuel injection system, the fuel injection system including a system that performs fuel injections by selectively using an in-cylinder injection and a port injection according to a selected fuel injection mode; and
  suspend carrying out the diagnosis in the mask period and carry out the diagnosis outside the mask period,
 wherein, in the step of calculating the corrected value, the program further causes the processor to calculate an integrated value of the difference and a learned value which corresponds to a steady component of the integrated value, and in the step of setting the mask period, the program further causes the processor to set the mask period by using the integrated value and the learned value, and wherein, in the step of setting the mask period, the program further causes the processor to set the mask period in a case where the integrated value is outside a normal range in which the target value is included, and in the step of setting the mask period, the program further causes the processor to set the mask period in accordance with a deviation amount of the integrated value from the normal range.

\* \* \* \* \*